July 2, 1929.  M. BLENZ  1,719,042
MILK BOILER INSET
Filed Feb. 5, 1929
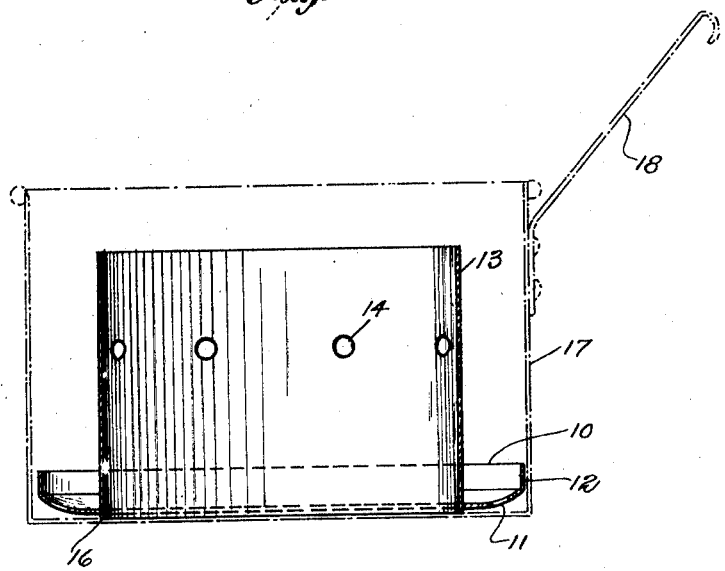
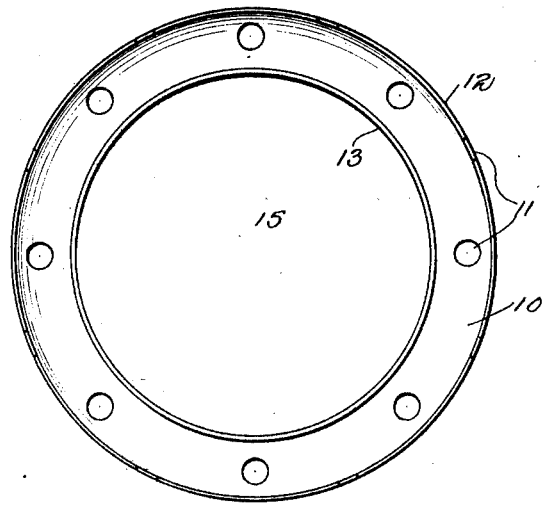
INVENTOR
Martin Blenz
BY
George C. Heinrich
ATTORNEY Patented July 2, 1929.

1,719,042

UNITED STATES PATENT OFFICE.

MARTIN BLENZ, OF BRONX, NEW YORK.

MILK-BOILER INSET.

Application filed February 5, 1929. Serial No. 337,618.

This invention relates to improvements in the culinary art particularly to a device to be used in conjunction with kettles, pots, boilers or like culinary vessels, and more particularly to a device used as an inset for the purpose of preventing milk from boiling over, in order to avoid loss of milk and the well known obnoxious odor developing if the milk boiling over the pot comes in contact with the hot stove.

It is the principal object of my invention to provide an inset for pots, etc., of simple and inexpensive construction yet durable and efficient in its operation, positively preventing the milk from boiling over.

Another object of my invention is the provision of a device for preventing the boiling over of milk or the like which can be readily inserted into and removed from a pot or the like.

A further object of my invention is the provision of a device of this character which is equipped with a perforated foot part and a cylindrical perforated body part connected with said foot part allowing a returning of the rising milk to the bottom of the pot and a percolation and convection.

The above and additional objects will become more fully apparent as the description proceeds, and will then be specifically defined in the appended claims.

In the accompanying drawing forming a material part of this disclosure:

Fig. 1 is a sectional side elevation of a vessel shown in broken lines equipped with an inset constructed according to my invention.

Fig. 2 is a top plan view of the inset alone.

My improved and novel device for preventing the boiling over of milk or the like, as shown on the drawing, is composed of a foot part 10 having a plurality of openings 11 formed therein and substantially of the form of a dish with an upright flange.

Integrally made with said foot part is a cylindrical upright body 13 having a plurality of openings 14 in its mantle. This body 13 is suitably fastened at its lower end to a central inner marginal flange of the foot part surrounding its central opening 15, and extends somewhat below the lower face of the foot part as indicated at 16.

A pot suitable for the boiling of milk therein is indicated in broken lines at 17, and equipped with a handle 18.

It will be clear that any suitable vessel may be used in which the inset is placed, as indicated in Figure 1.

If the milk starts to boil and consequently to rise within pot 17, it will enter the cylindrical body through the openings 14 therein and flow downwards towards the bottom of the pot and then rise again through the openings in the foot part and thus a continuous percolation and convection will take place while the milk will be positively prevented from boiling over the upper margin of the pot.

It will be understood that I have shown and described the preferred form of my device only as one example of the many possible ways to practically construct the same, and that I may make such changes in the construction of my device as come within the scope of the appended claims without departure from my invention and the principle involved.

Having thus described my invention, what I claim as new and desire to secure by Letters Patent is:—

1. An inset for milk boilers comprising a dish-like foot part having a plurality of perforations, and a central opening, an upright marginal flange on said foot part, and a cylindrical perforated body secured at its lower end to said foot part in the central opening thereof, said perforations in foot part and body adapted to impart to the rising milk in the boiler a deviation from its upwardly directed flow downwards and allowing a percolation and invection of the milk on its upwardly directed return path.

2. An inset for milk boilers for preventing overflowing of the milk, comprising a dish-like perforated foot part having a central opening, upstanding flanges on the inner and outer peripheries of said foot part, and an upstanding cylindrical body having a plurality of perforations in its mantle secured at its lower end to the inner peripheral flange of said foot part, and extending somewhat below the same, the perforations in said cylindrical body effecting a return of the rising milk to the bottom of the boiler and the perforation in said foot part allowing a rising of the milk again under percolation and invection.

Signed at New York, in the county of New York, and State of New York this 31st day of January, A. D. 1929.

MARTIN BLENZ.